US011816202B2

(12) United States Patent
Mondello et al.

(10) Patent No.: US 11,816,202 B2
(45) Date of Patent: *Nov. 14, 2023

(54) RUN-TIME CODE EXECUTION VALIDATION

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 74 days.

This patent is subject to a terminal disclaimer.

(21) Appl. No.: 17/682,397

(22) Filed: Feb. 28, 2022

(65) Prior Publication Data

US 2022/0179945 A1 Jun. 9, 2022

Related U.S. Application Data

(63) Continuation of application No. 16/362,741, filed on Mar. 25, 2019, now Pat. No. 11,263,308.

(51) Int. Cl.
*G06F 21/52* (2013.01)
*G06F 21/55* (2013.01)
(Continued)

(52) U.S. Cl.
CPC .............. *G06F 21/52* (2013.01); *G06F 21/00* (2013.01); *G06F 21/50* (2013.01); *G06F 21/554* (2013.01);
(Continued)

(58) Field of Classification Search
CPC .......... G06F 21/52; G06F 21/00; G06F 21/50; G06F 21/554; G06F 21/71; G06F 2221/033; G06F 21/55; H04L 9/3242
See application file for complete search history.

(56) References Cited

U.S. PATENT DOCUMENTS 5,764,989 A 6/1998 Gustafsson et al.
7,461,249 B1 * 12/2008 Pearson ................. G06F 21/57
713/193

(Continued)

FOREIGN PATENT DOCUMENTS

CN 101978377 A 2/2011
CN 103583061 A 2/2014
(Continued)

OTHER PUBLICATIONS

U.S. Appl. No. 15/853,498, entitled, "Physical Unclonable Function Using Message Authentication Code", filed Dec. 22, 2017, 28 pages.
(Continued)

*Primary Examiner* — Jung W Kim
*Assistant Examiner* — Howard H. Louie
(74) *Attorney, Agent, or Firm* — Brooks, Cameron & Huebsch, PLLC

(57) ABSTRACT

The present disclosure includes apparatuses, methods, and systems for run-time code execution validation. An embodiment includes a memory, and circuitry configured to monitor run-time executable code stored in a secure array of the memory device and receive an indication that a portion of the run-time executable code executed, wherein the indication includes a received Message Authentication Code (MAC) and take an action in response to the indication that the portion of the run-time executable code failed to execute.

20 Claims, 13 Drawing Sheets

(51) Int. Cl.
  *G06F 21/50* (2013.01)
  *G06F 21/71* (2013.01)
  *G06F 21/00* (2013.01)
  *H04L 9/32* (2006.01)

(52) U.S. Cl.
  CPC ............ *G06F 21/71* (2013.01); *H04L 9/3242* (2013.01); *G06F 2221/033* (2013.01)

(56) References Cited

U.S. PATENT DOCUMENTS

| | | | |
|---|---|---|---|
| 9,177,153 B1* | 11/2015 | Perrig | G06F 21/57 |
| 9,621,549 B2 | 4/2017 | Benoit et al. | |
| 2003/0120923 A1* | 6/2003 | Gilman | G06F 21/10 |
| | | | 713/170 |
| 2004/0003246 A1 | 1/2004 | Hopkins et al. | |
| 2004/0015623 A1 | 1/2004 | Yusuf | |
| 2008/0117679 A1 | 5/2008 | Srinivasan et al. | |
| 2008/0235336 A1* | 9/2008 | Stern | H04L 63/0407 |
| | | | 709/206 |
| 2009/0063907 A1 | 3/2009 | Tsuboi et al. | |
| 2009/0204823 A1 | 8/2009 | Giordano et al. | |
| 2009/0254738 A1* | 10/2009 | Sato | G06F 21/52 |
| | | | 712/241 |
| 2010/0058070 A1 | 3/2010 | Garay et al. | |
| 2013/0328745 A1* | 12/2013 | Koltuk | G06F 3/1446 |
| | | | 345/1.3 |
| 2014/0096253 A1 | 4/2014 | Morchon et al. | |
| 2015/0032951 A1 | 1/2015 | Goss et al. | |
| 2015/0205648 A1* | 7/2015 | Takada | G06F 11/3409 |
| | | | 712/208 |
| 2017/0235957 A1 | 8/2017 | Maletsky | |
| 2018/0131522 A1* | 5/2018 | Lawlis | H04L 9/0631 |
| 2019/0007427 A1* | 1/2019 | Yajima | H04L 63/108 |
| 2019/0043600 A1 | 2/2019 | Saileshwar et al. | |
| 2019/0229913 A1* | 7/2019 | Fava | H04L 9/0891 |
| 2019/0266331 A1 | 8/2019 | Sanchez et al. | |
| 2020/0074123 A1* | 3/2020 | Meiler | G06F 21/86 |
| 2020/0369242 A1* | 11/2020 | Komedani | B60R 25/24 |

FOREIGN PATENT DOCUMENTS

| | | |
|---|---|---|
| CN | 107085675 A | 8/2017 |
| JP | 2009-059005 A | 3/2009 |
| KR | 10-2017-0039138 A | 4/2017 |
| WO | 2010-218237 A | 9/2010 |
| WO | 2019/030763 A1 | 2/2019 |

OTHER PUBLICATIONS

U.S. Appl. No. 16/201,652, entitled, "Parking Infrastructure Powered by a Decentralized, Distributed Database", filed Nov. 27, 2018, 27 pages.
U.S. Appl. No. 15/993,119, entitled, "Transmission of Vehicle Route Information by Passive Devices", filed May 30, 2018, 25 pages.
U.S. Appl. No. 16/034,763, entitled, "Secure Vehicular Communication", filed Jul. 13, 2018, 37 pages.
U.S. Appl. No. 16/034,809, entitled, "Secure Vehicular Services Communication", filed Jul. 13, 2018, 36 pages.
PCT International Application No. PCT/IB2019/000089, entitled, "Method for Improving Safety of a Component or System Running a Firmware or a Finite State Machine", filed Feb. 22, 2019, 42 pages.
International Search Report & Written Opinion from related International Application No. PCT/US2020/023843, dated Jul. 9, 2020, 13 pages.
First Office Action from related Chinese Patent Application No. 202080023850.7, dated May 13, 2022, 8 pages.

* cited by examiner

| START ADDRESS | END ADDRESS | FRESHNESS | OCCURENCE | MAC |
|---|---|---|---|---|
| $S\_addr_0$ | $E\_addr_0$ | MTC/NONCE/etc | 5 | N bytes |
| $S\_addr_1$ | $E\_addr_1$ | MTC/NONCE/etc | 3 | N bytes |
| . . . | . . . | MTC/NONCE/etc | 4 | N bytes |
| $S\_addr_M$ | $E\_addr_M$ | MTC/NONCE/etc | 0 | N bytes |

*Fig. 4*

RUN-TIME CODE EXECUTION VALIDATION

PRIORITY INFORMATION

This application is a continuation of U.S. application Ser. No. 16/362,741, filed on Mar. 25, 2019, the contents of which are incorporated herein by reference.

TECHNICAL FIELD

The present disclosure relates generally to semiconductor memory and methods, and more particularly, to run-time code validation of memory commands.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), and magnetic random access memory (MRAM), among others.

Memory devices can be combined together to form a solid state drive (SSD), an embedded MultiMediaCard (e.g., MMC), and/or a universal flash storage (UFS) device. An SSD, e.MMC, and/or UFS device can include non-volatile memory (e.g., NAND flash memory and/or NOR flash memory), and/or can include volatile memory (e.g., DRAM and/or SDRAM), among various other types of non-volatile and volatile memory. Non-volatile memory may be used in a wide range of electronic applications such as personal computers, portable memory sticks, digital cameras, cellular telephones, portable music players such as MP3 players, movie players, among others.

Flash memory devices can include memory cells storing data in a charge storage structure such as a floating gate, for instance. Flash memory devices typically use a one-transistor memory cell that allows for high memory densities, high reliability, and low power consumption. Resistance variable memory devices can include resistive memory cells that can store data based on the resistance state of a storage element (e.g., a resistive memory element having a variable resistance).

Memory cells can be arranged into arrays, and memory cells in an array architecture can be programmed to a target (e.g., desired) state. For instance, electric charge can be placed on or removed from the charge storage structure (e.g., floating gate) of a flash memory cell to program the cell to a particular data state. The stored charge on the charge storage structure of the cell can indicate a threshold voltage (Vt) of the cell. A state of a flash memory cell can be determined by sensing the stored charge on the charge storage structure (e.g., the Vt) of the cell.

Many threats can affect the operation of a memory device and/or the data stored in the memory cells of the memory device. Such threats can include, for example, threats from hackers or other malicious users, including man-in-the-middle (MITM) attacks, among others. Such threats can cause significant financial loss, and/or can present significant safety and/or security issues.

BRIEF DESCRIPTION OF THE DRAWINGS

FIG. 4 illustrates an example table for run-time code execution validation in accordance with embodiments of the present disclosure.

DETAILED DESCRIPTION

Figure 1:
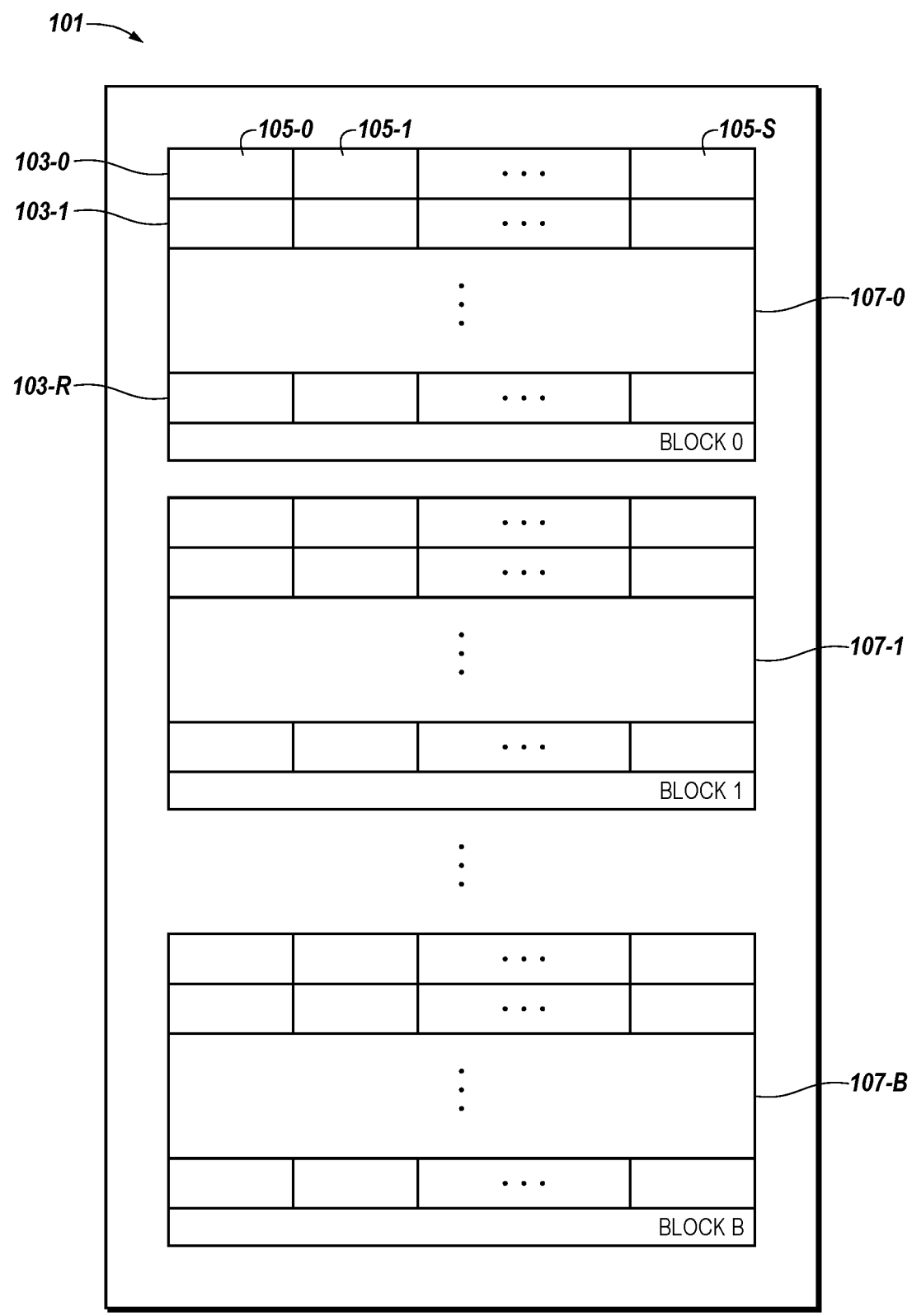
FIG. 1 illustrates a diagram of a portion of a memory array having a number of physical blocks in accordance with an embodiment of the present disclosure.

The present disclosure includes apparatuses, methods, and systems for run-time code execution verification of memory commands. An embodiment includes a memory, and circuitry configured to receive a command that is included in a memory of a memory device and validating that the commands to be executed on the memory were executed, wherein the command includes an anti-replay portion which is used in the generation of a Message Authentication Code (MAC) to validate that the command was executed. Upon validating that the command was executed, providing a software service.

Many threats can affect the operation of memory (e.g. a memory device) and/or the data stored therein (e.g., the data stored in the memory cells of the memory device). For example, a hacker or other malicious user may attempt to perform activities (e.g., attacks), such as, for instance, a man-in-the-middle (MITM) attack, to make unauthorized changes to the operation of the memory, and/or to the data stored therein, for malicious purposes. One example of an MITM attack is a replay attack, in which a valid command (e.g., a command that has been validly issued to a memory device) is caused to be fraudulently repeated (e.g., reissued) and/or fraudulently re-executed (e.g., reused) by the memory device multiple (e.g., many) times. Such hacking activities can cause significant financial loss, and/or can present significant safety and/or security issues.

Another example of a threat is a hacker or other malicious user can attempt to skip a portion of a command (e.g., a portion of executable code) referred herein as a routine, written as a check and/or as a security protocol to authenticate the command. During such an attack, the routine is skipped, but the host may receive an indication that the routine was executed. Said differently, a hacker may falsify the indication received by the host that the routine was executed. Important routines written to check the authenticity of a command (authenticate a component, authenticate a software version and/or update, user identity, etc.) may be designed to execute during the run-time of a command. A hacker may change (e.g., mask) an external input to trigger conditions which may skip the routine written to validate the authenticity of the command. One example of such routine may be a portion of executable code written to check the authenticity of payment prior to execution of a software service (e.g., issuance of currency from an automatic teller machine and/or transfer of data, execution of software, etc.). Other examples may include routines to validate a software license to authenticate that the software is genuine prior to execution (computer systems updates, installation of software, etc.), and/or a routine to check the genuineness of a system component and the configuration of the system component (e.g., process plant control, automotive components).

As such, in order to ensure a portion of executable code (a routine) was executed and was not skipped, an anti-replay (e.g., freshness) mechanism may be incorporated into the routine to validate that a command received by the memory has not been skipped (e.g., falsely indicating that the routine was executed). In order to prevent commands from being skipped, fraudulently repeated, and/or fraudulently re-executed as part of an MITM replay attack, the anti-replay mechanism may be used as a component in the calculous of a MAC. Previous code validation can include hashing for attestation utilizing a golden hash where the golden hash is calculated and stored in an inaccessible memory region. At power-up, or at a user request, data may be hashed (e.g., using SHA-256) and the hashed data may be compared to the golden hash to provide data attestation. However, these checks are performed in a static instance where there is no way to determine if the correct stored code (e.g., the routine) was actually executed, or if it was skipped and a false indication of execution was provided to falsify the execution of the routine.

In contrast, embodiments of the present disclosure can utilize cryptographic solutions to run-time code execution validation by incorporating anti-replay mechanisms during run-time of the routine, and/or after the host has received an indication that the routine was executed. Such solutions can determine whether the routine was actually executed, or, skipped by a hacker, malicious user, and/or run-time error. For instance, a host may receive an indication that the routine was executed, and the indication may be a received MAC. At the end of execution of the routine (or during execution of the routine) the host may recalculate the MAC with the known anti-replay mechanism and a copy of a signature (e.g., private key). If the received MAC and the generated MAC match, the routine was actually executed. If the received MAC and the generated MAC do not match, the routine was skipped, and the host may implement countermeasures (e.g., an alarm, etc.).

As used herein, "a", "an", or "a number of" can refer to one or more of something, and "a plurality of" can refer to two or more such things. For example, a memory device can refer to one or more memory devices, and a plurality of memory devices can refer to two or more memory devices. Additionally, the designators "R", "B", "S", and "N", as used herein, particularly with respect to reference numerals in the drawings, indicates that a number of the particular feature so designated can be included with a number of embodiments of the present disclosure. The number may be the same or different between designations.

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2.

FIG. 1 illustrates a diagram of a portion of a memory array 101 having a number of physical blocks in accordance with an embodiment of the present disclosure. Memory array 101 can be, for example, a flash memory array such as a NAND flash memory array. As an additional example, memory array 101 can be a resistance variable memory array such as a PCRAM, RRAM, MMRAM, or spin torque transfer (STT) array, among others. However, embodiments of the present disclosure are not limited to a particular type of memory array. Further, memory array 101 (e.g., a subset of array 101, or the whole array 201) can be a secure memory array, as will be further described herein. Further, although not shown in FIG. 1, memory array 101 can be located on a particular semiconductor die along with various peripheral circuitry associated with the operation thereof.

As shown in FIG. 1, memory array 101 has a number of physical blocks 107-0 (BLOCK 0), 107-1 (BLOCK 1), . . . , 107-B (BLOCK B) of memory cells. The memory cells can be single level cells and/or multilevel cells such as, for instance, two level cells, triple level cells (TLCs) or quadruple level cells (QLCs). As an example, the number of physical blocks in memory array 101 may be 128 blocks, 512 blocks, or 1,024 blocks, but embodiments are not limited to a particular power of two or to any particular number of physical blocks in memory array 101.

A number of physical blocks of memory cells (e.g., blocks 107-0, 107-1, . . . , 107-B) can be included in a plane of memory cells, and a number of planes of memory cells can be included on a die. For instance, in the example shown in FIG. 1, each physical block 107-0, 107-1, . . . , 107-B can be part of a single die. That is, the portion of memory array 101 illustrated in FIG. 1 can be a die of memory cells.

As shown in FIG. 1, each physical block 107-0, 107-1, . . . , 107-B includes a number of physical rows (e.g., 103-0, 103-1, . . . , 103-R) of memory cells coupled to access lines (e.g., word lines). The number of rows (e.g., word lines) in each physical block can be 32, but embodiments are not limited to a particular number of rows 103-0, 103-1, . . . , 103-R per physical block. Further, although not shown in FIG. 1, the memory cells can be coupled to columns of sense lines (e.g., data lines and/or digit lines).

As one of ordinary skill in the art will appreciate, each row 103-0, 103-1, . . . , 103-R can include a number of pages of memory cells (e.g., physical pages). A physical page refers to a unit of programming and/or sensing (e.g., a number of memory cells that are programmed and/or sensed together as a functional group). In the embodiment shown in FIG. 1, each row 103-0, 103-1, . . . , 103-R comprises one physical page of memory cells. However, embodiments of the present disclosure are not so limited. For instance, in an embodiment, each row can comprise multiple physical pages of memory cells (e.g., one or more even pages of memory cells coupled to even-numbered data lines, and one or more odd pages of memory cells coupled to odd numbered data lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

As shown in FIG. 1, a page of memory cells can comprise a number of physical sectors 105-0, 105-1, . . . , 105-S (e.g., subsets of memory cells). Each physical sector 105-0, 105-1, . . . , 105-S of cells can store a number of logical sectors of data. Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector 105-0, 105-1, . . . , 105-S, can store system and/or user data, and/or can include overhead data, such as error correction code (ECC) data, logical block address (LBA) data, and metadata.

Logical block addressing is a scheme that can be used by a host for identifying a logical sector of data. For example, each logical sector can correspond to a unique logical block address (LBA). Additionally, an LBA may also correspond (e.g., dynamically map) to a physical address, such as a physical block address (PBA), that may indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks 107-0, 107-1, . . . , 107-B, rows 103-0, 103-1, . . . , 103-R, sectors 105-0, 105-1, . . . , 105-S, and pages are possible. For example, rows 103-0, 103-1, . . . , 103-R of physical blocks 107-0, 107-1, . . . , 107-B can each store data corresponding to a single logical sector which can include, for example, more or less than 512 bytes of data.

Figure 2:
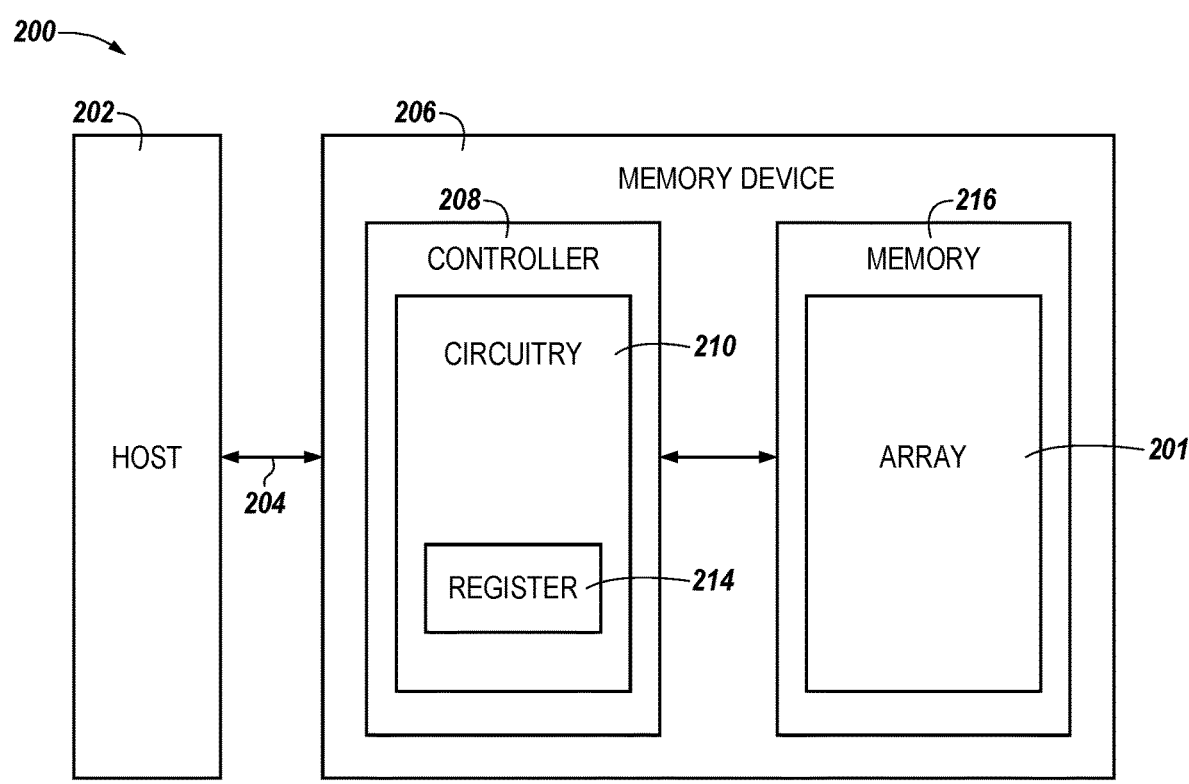
FIG. 2 is a block diagram of a computing system including a host and an apparatus in the form of a memory device in accordance with an embodiment of the present disclosure.

FIG. 2 is a block diagram of a computing system 200 including a host 202 and an apparatus in the form of a memory device 206 in accordance with an embodiment of the present disclosure. As used herein, an "apparatus" can refer to, but is not limited to, any of a variety of structures or combinations of structures, such as a circuit or circuitry, a die or dice, a module or modules, a device or devices, or a system or systems, for example. Further, in an embodiment, computing system 200 can include a number of memory devices analogous to memory device 206.

In the embodiment illustrated in FIG. 2, memory device 206 can include a memory 216 having a memory array 201. Memory array 201 can be analogous to memory array 101 previously described in connection with FIG. 1. Further, in an embodiment, memory array 201 (e.g., a subset of array 201, or the whole array 201) can be a secure array (e.g., an area of memory 216 to be kept under control). For example, the data stored in memory array 201 can include sensitive (e.g., non-user) data, such as host firmware and/or code to be executed for sensitive applications. Although one memory array 201 is illustrated in FIG. 2, memory 216 can include any number of memory arrays analogous to memory array 201.

As illustrated in FIG. 2, host 202 can be coupled to the memory device 206 via interface 204. Host 202 and memory device 206 can communicate (e.g., send commands and/or data) on interface 204. Host 202 and/or memory device 206 can be, or be part of, a computing device, a laptop computer, personal computer, digital camera, digital recording and playback device, mobile telephone, PDA, memory card reader, interface hub, or Internet of Things (IoT) enabled device, such as, for instance, an automotive (e.g., vehicular and/or transportation infrastructure) IoT enabled device or a medical (e.g., implantable and/or health monitoring) IoT enabled device, an automatic teller machine (ATM), among other host systems, and can include a memory access device (e.g., a processor). One of ordinary skill in the art will appreciate that "a processor" can intend one or more processors, such as a parallel processing system, a number of coprocessors, etc.

Interface 204 can be in the form of a standardized physical interface. For example, when memory device 206 is used for information storage in computing system 200, interface 204 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. In general, however, interface 204 can provide an interface for passing control, address, information (e.g., data), and other signals between memory device 206 and a host (e.g., host 202) having compatible receptors for interface 204.

Memory device 206 includes controller 208 to communicate with host 202 and with memory 216 (e.g., memory array 201). For instance, controller 208 can send commands to perform operations on memory array 201, including operations to sense (e.g., read), program (e.g., write), move, and/or erase data, among other operations.

Controller 208 can be included on the same physical device (e.g., the same die) as memory 216. Alternatively, controller 208 can be included on a separate physical device that is communicatively coupled to the physical device that includes memory 216. In an embodiment, components of controller 208 can be spread across multiple physical devices (e.g., some components on the same die as the memory, and some components on a different die, module, or board) as a distributed controller.

Host 202 can include a host controller (not shown FIG. 2) to communicate with memory device 206. The host controller can send commands to memory device 206 via interface 204. The host controller can communicate with memory device 206 and/or the controller 208 on the memory device 206 to read, write, and/or erase data, among other operations. Further, in an embodiment, host 202 can be an IoT enabled device, as previously described herein, having IoT communication capabilities.

Controller 208 on memory device 206 and/or the host controller on host 202 can include control circuitry and/or logic (e.g., hardware and firmware). In an embodiment, controller 208 on memory device 206 and/or the host controller on host 202 can be an application specific integrated circuit (ASIC) coupled to a printed circuit board including a physical interface. Also, memory device 206 and/or host 202 can include a buffer of volatile and/or non-volatile memory and a number of registers (e.g., register 214).

For example, as shown in FIG. 2, memory device can include circuitry 210. In the embodiment illustrated in FIG. 2, circuitry 210 is included in controller 208. However, embodiments of the present disclosure are not so limited. For instance, in an embodiment, circuitry 210 may be included in (e.g., on the same die as) memory 216 (e.g., instead of in controller 208). Circuitry 210 can comprise, for instance, hardware, firmware, and/or software.

Computing system 200 (e.g., host 202 and memory device 206) can utilize run-time code execution validation of code using an anti-replay (e.g., freshness) mechanism to confirm that a portion of executable code is executed. For example, the circuitry 210 may monitor run-time executable code stored in a secure array of the memory device 206. As used herein, validating the code (and/or routine) can include and/or refer to ensuring that the routine has not been previously executed, or skipped on memory 216 (e.g., to ensure that the command is not being fraudulently repeated, skipped, and/or re-used as part of an attach such as MITM replay attack).

The monitored run-time executable code may include a routine comprising a portion of run-time executable code to check and/or verifiy the authenticity of the instruction included in the monitored run-time executable code. For example, the portion of run-time executable code can be a part of a routine to validate that a security protocol transpired. The routine may be an important security check and thus be monitored by the circuitry 210. In some examples, the routine may be executed as a check to verify an identity of a user, a component of the computing system 200, a component of the host 202, a software license, etc. When the portion of run-time executable code is executed, the computing system 200 can verify that the routine is authentic, and the service may be provided. The security of the computing system 200 may be enhanced by the verification that that the routine was not skipped.

For example, host 202 can generate a table (discussed in detail in connection with FIG. 4) including an anti-replay portion, which may be referred to herein as a freshness field, for (e.g., to be included with) a command to be executed on memory 216 (e.g., on memory array 201). The table may also include an occurrence field representing a quantity of incidences that the run-time executable code has executed, the start address, and the end address, of the secure array of the memory device 206. The start address indicates where the run-time executable code to be monitored begins, and the end address indicates where the run-time executable code ends. The table may include a field for a MAC which may be received as an indication that the monitored run-time executable code has been executed and/or the received MAC may be an indication that the monitored run-time code failed to execute (when the received MAC is verified against an expected MAC).

For example, the circuitry 210 can receive an indication that a portion of the run-time executable code executed during run-time of a computing device (e.g., the host 202) has failed to execute, where the indication includes a received MAC. In this instance, the circuitry 210 may compare the received MAC to an expected MAC and determine that the received MAC was fraudulently generated. The expected MAC can include a freshness value from the freshness field of the table written by the memory device 206 when a start address of the secure array 201 is defined by the host 202. In response to this determination the host 202 may take an action in response to the indication that the portion of the run-time executable code failed to execute.

Specifically, for example, the circuitry 210 may be configured to generate, during run-time of the computing device (e.g., the host 202), an expected MAC; and compare, during run-time of the computing device, the expected MAC to the received MAC as part of an operation to check a validity of the received MAC. In this instance, the received MAC matching the expected MAC indicates that the routine was actually executed. In contrast, the received MAC and the expected MAC having different values indicates that the routine was skipped and the host may respond with a countermeasure. For example, the host 202 may respond with a countermeasure such as an alarm, an alert, and/or refrain from providing the service requested by the run-time executable code.

The start address of each monitored run-time executable code is a non-volatile host register written (e.g., defined) by the host 202 using authenticated commands. The end address of the monitored run-time executable code is a non-volatile host register written using authenticated commands. The circuitry 210 can be configured to receive, as part of the received MAC, a start address of the secure array and an end address of the secure array, where the portions of run-time executable code between the start address and the end address are the routine which is monitored and verified by the circuitry 210.

The freshness field may include a freshness value written by the memory 216 when a program counter (e.g., a monotonic counter) included in the memory 216 reaches the start address of the routine. In some examples, the circuitry is configured to receive a freshness field as part of the received MAC. The occurrence field may be included to account for the number of times the routine was executed. Both the freshness field and the occurrence field are host 202 read-only fields. The MAC can be calculated by the memory 216 when the program counter reaches the end address when the routine is executed.

As will be discussed further herein, the circuitry 210 may generate an expected MAC using the freshness value and a copy of a digital signature and compare the resulting expected MAC to a generated MAC to determine if the routine was indeed executed or if the routine was skipped. For example, the circuitry 210 can be configured to compare the received MAC to a generated MAC, where the received MAC and the generated MAC have different values when the run-time executable code has failed to execute. The determination by the circuitry 210 of the failure of execution of the run-time executable code may be an indication that a hack, attack, error, and/or manipulation by a malicious user may be in progress. Similarly, the occurrence field may be compared to an expected occurrence to determine if the routine was actually executed.

The freshness field may change with each execution of the routine by the host 202. Accordingly, the freshness field may be used to validate that the command was indeed executed because each time the freshness field changes the MAC will change. Further the MAC may be recalculated to determine an expected MAC, where the expected MAC is generated using a copy of a signature (e.g., a copy of a secret key). The signature can be, for instance, a digital signature generated using asymmetric cryptography (e.g., based on a public and/or private key), and can comprise, for instance, an elliptical curve digital signature. As an additional example, the signature can be generated using symmetric cryptography (e.g., based on a unique secret key shared between host 202 and memory device 206). The secret key can be exchanged by using any asymmetric protocol (e.g., the Diffie-Hellman protocol). In other examples, the key may be shared with the host 202 in a secure environment (e.g., factory production, secure manufacturing, etc.). The generation and validation of the secret key is discussed further in connection with FIGS. 8-12. The signature associated with host 202 can indicate that the routine was issued by host 202 (e.g., confirm the identity of the host), and accordingly can be used during the validation of the command, as will be further described herein.

Figure 3A:
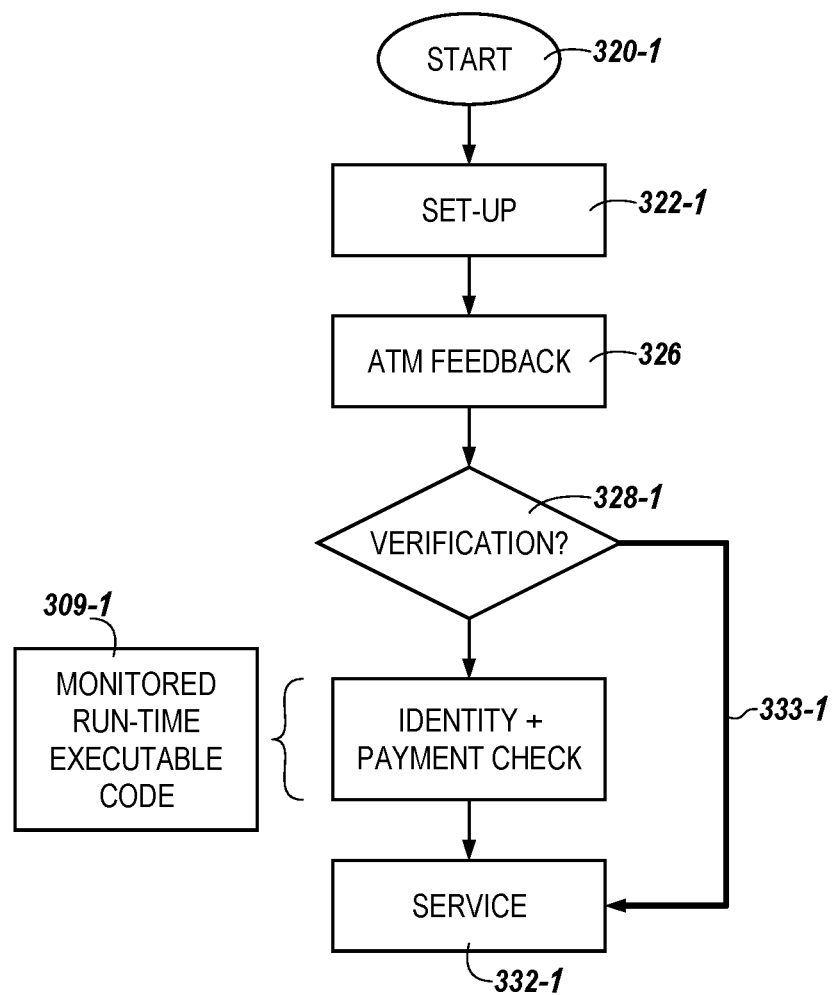
FIGS. 3A, 3B, and 3C illustrates example flow diagrams for run-time code execution validation in accordance with embodiments of the present disclosure.
Figure 3C:
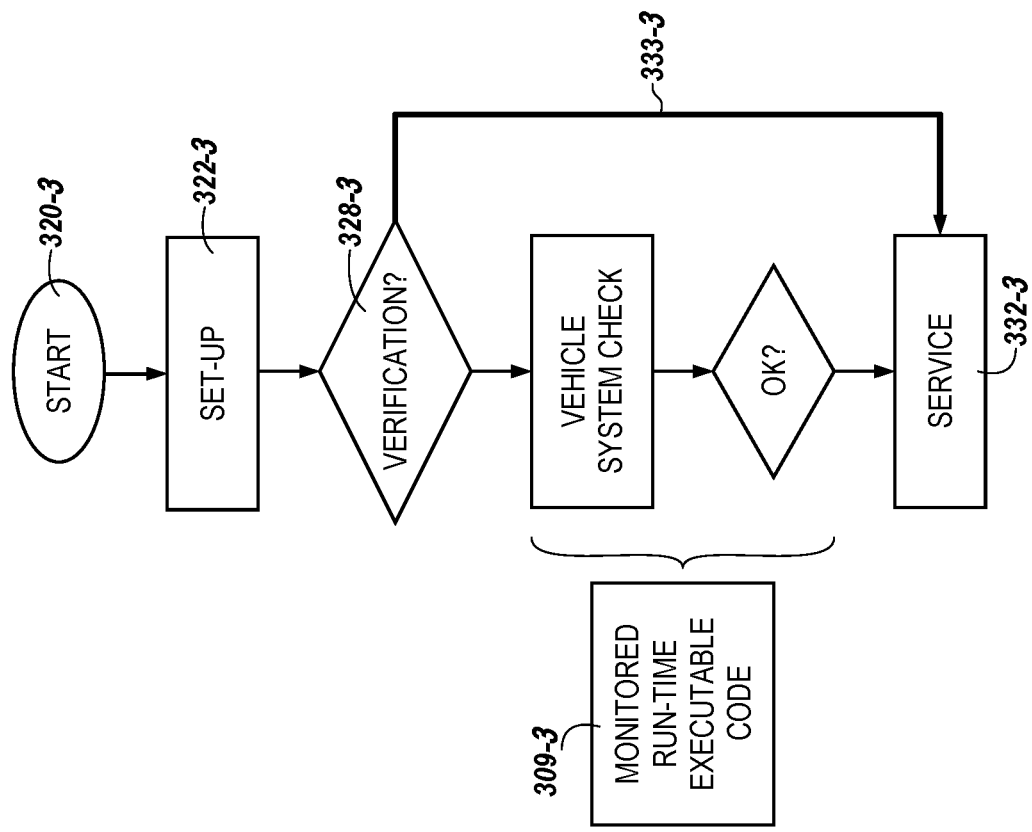
Figure 3B:
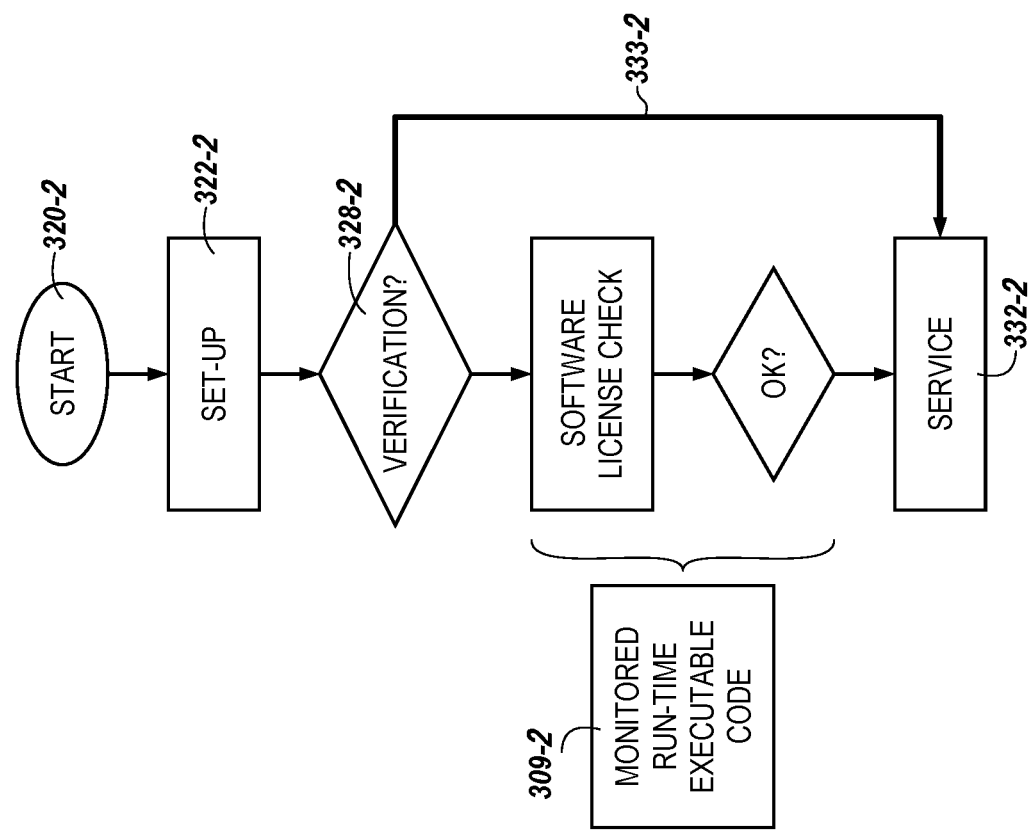

FIGS. 3A, 3B, and 3C are example flow diagrams for run-time code execution validation in accordance with embodiments of the present disclosure. Although not illustrated in FIGS. 3A, 3B, and 3C, as to not obscure the examples of the disclosure, FIGS. 3A, 3B, and 3C may include a computing system (e.g., the computing system 200), a memory device (e.g., the memory device 206), a memory (e.g., the memory 216), an array (e.g., the array 201), a controller (e.g., the controller 208), circuitry (e.g., the circuitry 210), a register (e.g., the register 214), and a host (e.g., the host 202) connected to the memory device vis an interface (e.g., the interface 204.

FIG. 3A illustrates an example flow diagram for a security protocol for an apparatus in the form of an ATM. The ATM, at 320-1, may receive a request for a service 332-1. At 320-1 the ATM may start by receiving a request from an entity to provide the service 332-1. As such, the ATM at 322-1 may set-up the request for service by defining the ATM feedback 326 required for verification at 328-1.

For example, the verification at 328-1 may be based on the ATM monitoring run-time executable code 309 stored in a secure array of a memory device. The set-up at 322-1, includes defining, by the host, that a portion of the run-time executable code is an identity and payment check. In this instance, the monitored run-time executable code 309 is a is a payment service check routine, which is a security routine to verify that the request and payment is genuine. As such, the host may verify that the monitored run-time executable code 309 was actually executed and not skipped as indicated by the arrow at 333-1.

For example, receiving, by circuitry included in the ATM, an indication that the run-time executable code has executed may prompt the circuitry to verify that the monitored run-time executable code 309 was actually executed and not skipped. In this instance, the indication may be a received MAC indicating that the monitored run-time executable code 309 was executed. To verify, at 328-1, that the ATM feedback 326 was considered in the identity and payment check, the circuitry may recalculate an expected MAC using a copy of a secret key and/or comparing an expected occurrence value to a received occurrence value to determine if the monitored run-time executable code 309 was actually executed.

For example, determining that a portion of the monitored run-time executable code 309 failed to execute may be based on the indication, wherein the indication comprises at least one of a received MAC and a received occurrence representing a quantity of incidences that the run-time executable code has executed. In this instance, the received MAC may not match a generated (recalculated) expected MAC which was recalculated using a copy of the private key. In this instance, the non-matching MACs indicate that the monitored run-time executable code 309 was skipped as illustrated by the arrow at 333-1. The determination that the generated and the expected MACs do not match may indicate that the routine was skipped and that the ATM is being hacked or attacked to obtain service 332-1 without the verification of payment or identity. As such, generating, by the host, a countermeasure in response to the determination that the monitored run-time executable code 309 failed to execute may avoid costly security breaches. In some examples, the countermeasure is to abort the run-time executable code in response to the determination that the portion of the monitored run-time executable code 309 failed to execute.

As mentioned, the host may determine whether the monitored run-time executable code 309 executed based on a generated and expected occurrence. For example, the circuitry may receive an occurrence value as an indication that the routine was executed. The received occurrence may be a value indicating a quantity of times that the monitored run-time executable code 309 has been executed. Specifically, the value of occurrences may change each time the monitored run-time executable code 309 executes, and the table described herein may be updated. As such, the host may identify an expected occurrence and compare it to the received occurrence. The expected occurrence and the received occurrence having the same value indicates that the monitored run-time executable code 309 actually executed and the occurrence field of the table may be updated.

For example, a table may be updated to reflect the number of occurrences of code execution by comparing, by the circuitry, the received occurrence to an expected occurrence, and updating the quantity of incidences that the monitored run-time executable code 309 has executed in response to a determination that the expected occurrence and the received occurrence are the same. However, if the expected occurrence and the received occurrence values do not match, the monitored run-time executable code 309 may have been skipped and the host may execute countermeasures to avoid providing the service 332-1 under fraudulent conditions.

FIG. 3B illustrates an example flow diagram for a security protocol for an apparatus in the form of a computer device. The computing device, at 320-2, may receive a request for a service 332-2. At 320-2 the computing device may start by receiving a request from an entity to provide the service 332-2. As such, the computing device, at 322-2 may set-up the request for service 332-2 by defining the set-up 322-2 required for verification at 328-2. In the example illustrated by FIG. 3B, the set-up 322-2 may be defining a portion of monitored run-time executable code 309 which is a security routine to verify that software installed on the computing device is genuine, has the appropriate license, is from a trusted source, etc. For example, determining, by the host, that the portion of the run-time executable code is a software license check routine may avoid the installation of corrupted or malicious software. This routine may be an important security feature to avoid the installation of software that may hijack the operation of the computing device.

Malicious attacks may endeavor to skip the verification 328-2 as indicated by the arrow at 333-2. For example, the during an attack, the host (and/or the circuitry) may receive a MAC which may appear to indicate that the monitored run-time executable code 309 had been executed and the service 332-2 may be provided. As described in connection with FIG. 3A, the host and/or the circuitry may compare the received MAC to a generated (recalculated) MAC to confirm that the monitored run-time executable code 309 was actually executed. Likewise, the host and/or the circuitry may compare a received occurrence value and compare it to an expected occurrence value to determine that the monitored run-time executable code 309 actually executed. Based on these determinations, the host may abort the execution of the run-time code and refrain from providing the service 332-2, or the host may confirm that the monitored run-time executable code 309 was executed and provide the service 332-2.

FIG. 3C illustrates an example flow diagram for a security protocol for an apparatus in the form of a system component for a device (e.g., a vehicle). The vehicle, at 320-3, may receive a request for a service 332-3. At 320-3 the vehicle may start by receiving a request from an entity to provide the service 332-3. As such, the vehicle at 322-3 may set-up the request for service 332-3 by defining requirement for verification at 328-3. In the example illustrated by FIG. 3C, verification 328-3 may be a software verification similar to the examples described in connection with FIG. 3B. In the field of Internet of Things (IoT) enabled devices and autonomous vehicles, the verification of components, hardware, and software is important to the security of the vehicle. For example, the monitored run-time executable code 309 may include an anti-replay routine to detect whether the monitored portion of run-time executable code 309 has executed. As such, it is important to verify that security routines are actually executed such as the monitored run-time executable code 309 written to verify the various components in such vehicles are allowed.

Malicious attacks may endeavor to skip the verification 328-3 as indicated by the arrow at 333-3. For example, the during an attack, the host (and/or the circuitry) may receive a MAC which may appear to indicate that the monitored run-time executable code 309 had been executed and the service 332-3 may be provided. As described in connection with FIGS. 3A and 3B, the host and/or the circuitry may compare the received MAC to a generated (recalculated) MAC to confirm that the monitored run-time executable code 309 was actually executed. Likewise, the host and/or the circuitry may compare a received occurrence value and compare it to an expected occurrence value to determine that the monitored run-time executable code 309 actually executed. Based on these determinations, the host may abort the execution of the run-time code and refrain from providing the service 332-3, or the host may confirm that the monitored run-time executable code 309 was executed and provide the service 332-3.

FIG. 4 illustrates an example table 488 for run-time code execution validation in accordance with embodiments of the present disclosure. FIG. 4 illustrates the table 488 including columns for: a start address 434, an end address 435, a freshness field 437, an occurrence field 439, and a MAC field 440. The table 488 illustrated in FIG. 4 includes example values in each of the described fields, it should be understood that each field may include values different from those illustrated as examples.

The table 488 illustrated in FIG. 4 may exist on volatile or non-volatile memory and the table may be stored on the memory device (e.g., the memory device 206). The start address 434 and the end address 435 may be generated (e.g., written) by the host (e.g., the host 202) using an authenticated command. The start address 434 and the end address 435 may define where the run-time executable code (e.g., the monitored run-time executable code 309 for a routine begins and ends. The freshness 437 and the occurrence 439 may be updated as the run-time executable code defined by the start address 434 and the end address 435 is executed.

For example, a security routine may be executed multiple times. The host may define the start address 434 and the end address 435 where the routine (e.g., the monitored run-time executable code 309) is written. A new freshness 437 value is generated after each execution such that a unique MAC 440 is generated (e.g., calculated) for each execution. With each execution, the value of the occurrence 439 may change as well. When the routine is executed, a MAC 440 is generated. The circuitry (e.g., the circuitry 210) of the computing system (e.g., the computing system 200) may generate an expected MAC using a copy of a secret key to verify that the code was actually executed. Because the MAC is based on a secret key shared with the host, the expected MAC should match the generated MAC generated by the execution of the routine. A malicious user would not have access to the secret key, thus, should the routine be skipped, a fraudulent MAC may be generated in the table 488 that does not match the expected MAC generated by the host to verify the execution of the routine.

An example of a created pseudocode for a routine to be monitored for run-time code execution verification is given below:

```
//ASM: 1f66 8c502            set 0x45, 0x02
// etc...etc...
    for (BMS_Row=BMSRDMAX; BMS_Row !=0; BMS_Row--)
//ASM: 1f6b d2005             mov r0, 0x05
    {
        //etc...etc...
        SET_LDBIT(LSBMUINCADD) ;
//ASM: 1f7c 8e202             set 0x62, 0x02
    }
//ASM: 1f85 90001             sub r0, 0x01
//ASM: 1f86 92000             cmpsub r0, 0x00
//ASM: 1f87 0bfe5             jmp nz, 0x1f6c
// etc...etc...
    return (WL_YES) ;
//ASM: 1f8b d2000              mov r0, 0x01
//ASM: 1f8c 04000              return
    }
//etc...etc...
    return (WL_NO) ;
//ASM: 1f9b d2000              mov r0, 0x00
//ASM: 1f9c 04000              return
}
```

Where the start address 434 S_addr$_0$ is 1f66, the end address 435 E_addr$_0$ is 1f9c, and the run-time executable code between the start address 434 (S_addr$_0$ is 1f66) and the end address 435 (E_addr$_0$ is 1f9c) is the routine to be monitored for execution. In some examples, the run-time executable code may have multiple end points, thus the table may include a start address 434 with multiple end addresses 435.

For example, in an instance where the run-time executable code includes multiple end addresses, the table 488 may include multiple registers to reflect the multiple end addresses. For example, a first start address 434 for S_addr$_0$ is 1f66 and the corresponding end address 435 for E_addr$_0$ is 1f9c. A second start address 434 for S_addr$_1$ is 1f66 and the end address 435 for E_addr$_1$ is 1f8c. In other words, a routine may include run-time executable code with multiple end addresses 435 and the same start address 434.

The freshness 437 is written in the table illustrated by FIG. 4 as MTC/NONCE/etc., the freshness 437 field may be updated with a random number generator to produce a random number (the NONCE) and the MTC may be a program counter such as a monatomic counter (MTC). During the execution of the routine (e.g., the monitored run-time executable code) the freshness 437 is updated to a unique value to be concatenated in generating the MAC 440.

During an example execution of a routine using the above pseudocode for reference, the program counter (e.g., a monatomic counter) equals a start address 434 in the table. When this occurs, the freshness 435 value may be temporarily stored in the table. When the program counter reaches the end address 435, the occurrence 439 field is updated, a new freshness is generated for the next execution, and the MAC 440 is calculated.

Specifically, when a routine is genuinely executed, the generated (expected) MAC can be generated by hashing the following values: MAC=HMAC SHA256 [SecretKey, (start address|Instr$_1$|end address|Instr$_2$|freshness|Occurrence]. In this instance, using the above pseudo code for reference, where the start address 434 is 1f66, the Instr$_1$ is 8c502, the end address 435 is 1f9c, the Instr$_2$ is 04000 and the freshness 439 is 0000000F with an occurrence 439 of 0001 the generation of a MAC may be generated as follows: MAC=HMAC SHA256 [SecretKey, (1f668c5021f9c040000000000F0001)].

During an error, attack, and/or manipulation by a malicious entity, a received MAC may be represented in the table 488 illustrated in FIG. 4. The received MAC may be compared to an expected MAC to determine if the routine was actually executed. A fraudulently generated MAC would not be calculated including at least one of the secret key, the freshness, or the correct occurrence. Thus, a received MAC not matching an expected MAC may indicate that the routine was skipped. Similarly, a received occurrence and an expected occurrence being of different values is indicative that the routine was skipped, and a hacker may be attempting to receive a service (e.g., a service 332-1, 332-2, 332-3) fraudulently.

In some examples, the pairs of addresses as illustrated in table 466 may not necessarily signify the beginning and the end of an entire routine to be monitored, but may be portions or subsets of code within a routine. In some examples, the cryptographic validation for the run-time code execution is independent of the of a degree of complexity of the routine being validated. Said differently, the run-time code execution validation can proceed to generate an expected MAC to validate the execution of code regardless of the complexity of the routine being validated. For example, a routine to be validated may be complex such that the routine may include a branch of code within the routine that may be vulnerable to be skipped by a hacker during an attack. As such, the branch of code within the routine may be included in the Table 488 with an address pair denoting the branch within the routine. As such, the branch execution may be monitored during run-time and its execution may be verified.

Figure 5:
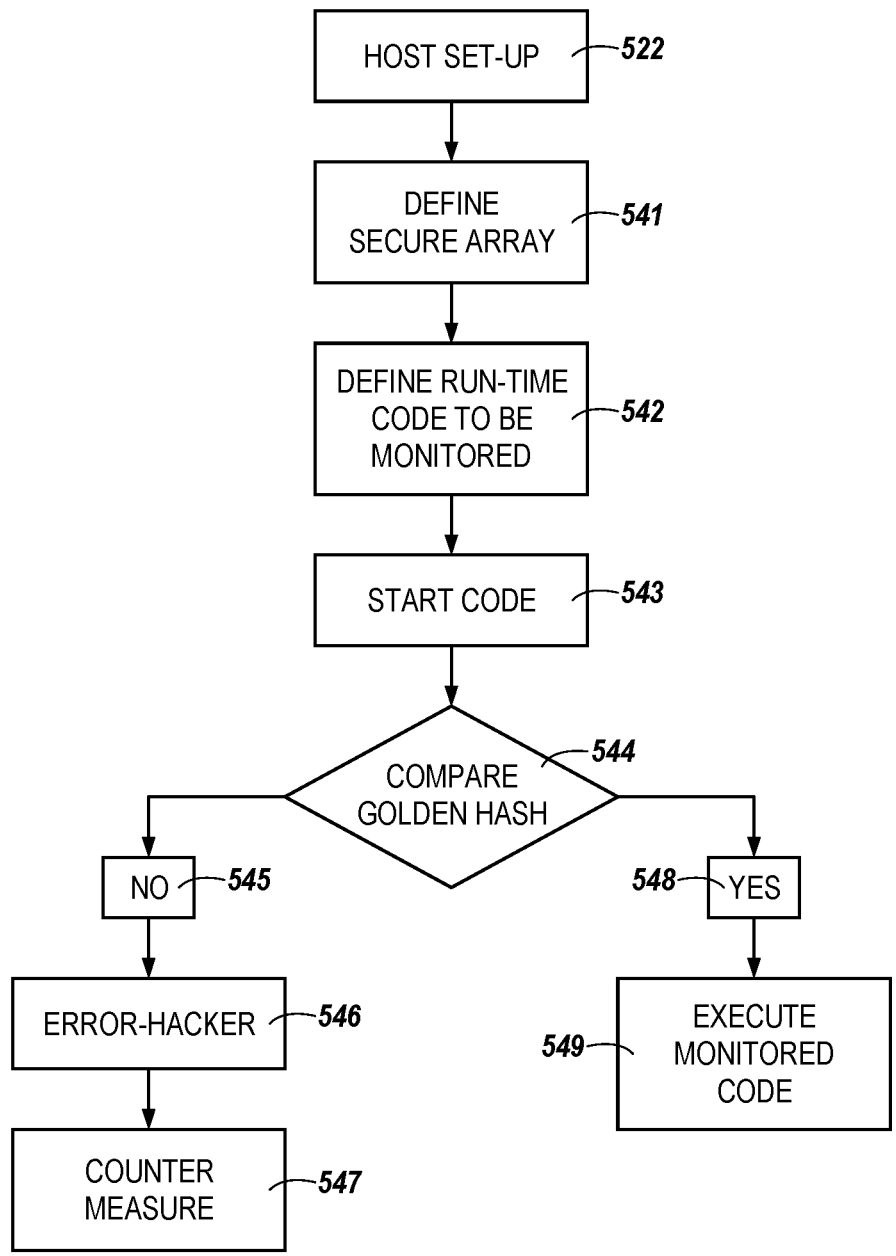
FIG. 5 illustrates an example flow diagram for run-time code execution validation in accordance with embodiments of the disclosure.

FIG. 5 illustrates an example flow diagram for run-time code execution validation in accordance with embodiments of the disclosure. At 522 the host (e.g., the host 202) may set up a memory device (e.g., the memory device 206). For example, the host may define the programs inside the data and firmware, define the secure array, calculate the golden digests, and define the routines (or the firmware portion) to be monitored. Specifically, at 541, the host may define the secure array by writing a start address (e.g., the start address 434) and an end address (e.g., the end address 435) into a table (e.g., the table 488). The written start address, and end address indicate the run-time executable code between is to be monitored such that the host and/or circuitry (e.g., the circuitry 210) may verify that the code was actually executed.

At 543, the execution of code can start when the device (e.g., the computing system 200) is used or at each power cycle/re-set of the device, during this start at 543, the integrity of the firmware is checked. For example, at 544, the golden hash is compared to the firmware to confirm that the firmware is genuine. If the hash of the firmware does not match the golden digest ("NO" at 545), at 546, an error or a hacker attack may be transpiring, and the host can, at 547, take action such as a countermeasures (e.g., an alert, abort execution of code, etc.). For example, the circuitry can be configured to generate a countermeasure in response to the determination that the golden hash and the hashed data from the secure array (e.g., the array 201) do not match.

However, if the golden hash and the hashed data from the secure array do match ("YES" at 548), the host may execute the monitored code at 549. For example, the host may run the firmware (e.g., the routine) stored or a portion of the stored firmware as a sub-routine or a sub-function. At the end of the execution, or during the run-time of the execution the host can verify the contents of the table in order to check if the routine was actually executed (e.g., the occurrence), and the MAC value received, these together may be referred to as a certificate of authenticity.

Figure 6:
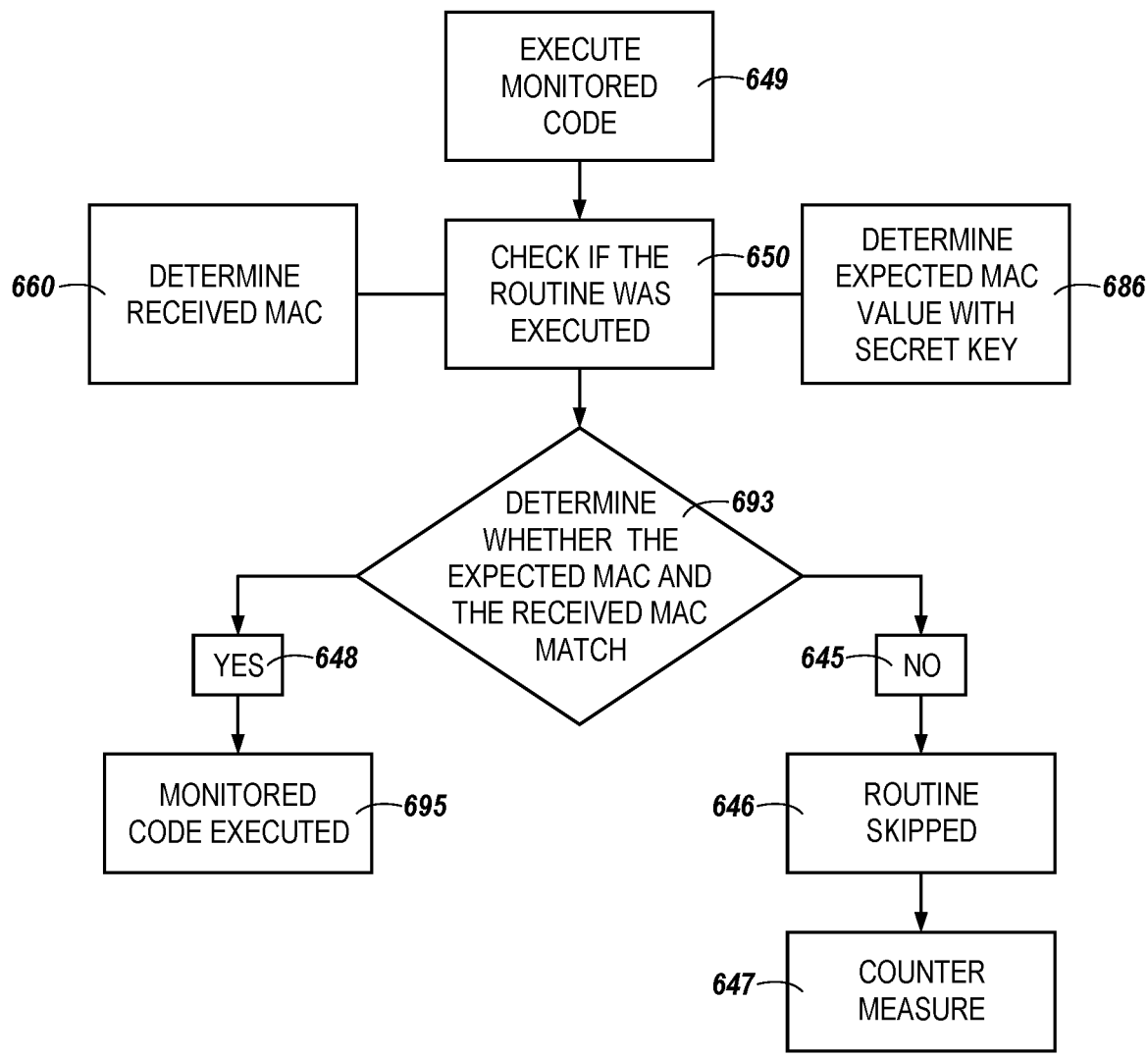
FIG. 6 illustrates an example flow diagram for run-time code execution validation in accordance with embodiments of the disclosure.

FIG. 6 illustrates an example flow diagram for run-time code execution validation in accordance with embodiments of the disclosure. At 649, the host (e.g., the host 202) may execute the monitored run-time executable code (e.g., the monitored run-time executable code 309) as a sub-function to verify if the routine was actually executed. For example, at 650, the circuitry (e.g., the circuitry 210), can check if the routine was executed. The circuitry can, at 660, receive a MAC in response to the execution of the run-time executable code defined on the memory (e.g., the memory 216). For example, at 660 the circuitry may determine the received MAC by checking the MAC field (e.g., the MAC 440 field) in a table (e.g., the table 488).

The circuitry, at 686, can determine an expected MAC value with a secret key. For example, the circuitry may generate (e.g., calculate) an expected MAC value using a copy of a secret key shared with the host. The secret key may be a digital signature generated using asymmetric cryptography, the generation and validation of which is discussed further in connection with FIGS. 8-12. In another example, the expected MAC can include a digital signature (e.g., the secret key) generated using symmetric cryptography discussed further in connection with FIG. 13. As mentioned in connection with FIG. 4, the expected MAC includes the start address, the end address, and a freshness of the run-time executable code. Since a MAC is based on the secret key and generated with a freshness, if the routine was actually executed, the received MAC and the expected MAC should be the same value when compared.

For example, the circuitry may compare the received MAC (from the table) to an expected MAC (recalculated) to check whether a portion of the run-time executable code defined on the memory executed. Thus, at 693, the circuitry may determine whether the expected MAC and the received MAC match (have the same value). If the expected MAC and the received MAC match, ("YES" at 648), the monitored run-time executable code (e.g., the routine) was executed at 695. When the received MAC and the expected MAC do not match ("NO" at 645), the circuitry may determine that a hacker may have skipped the execution of the routine at 646. As such, the host may take an action based on the comparison of the expected MAC and the received MAC.

For example, at 647, the host may take action in the form of a countermeasure, in response to the determination that the portion of the run-time executable code failed to execute. In other words, a secure routine was skipped, so the host may take action to abort offering the service (e.g., the service 332-1, 332-2, 332-3). The action taken by the host may be an alert to abort the service in response to the determination that the routine did not execute.

Figure 7:
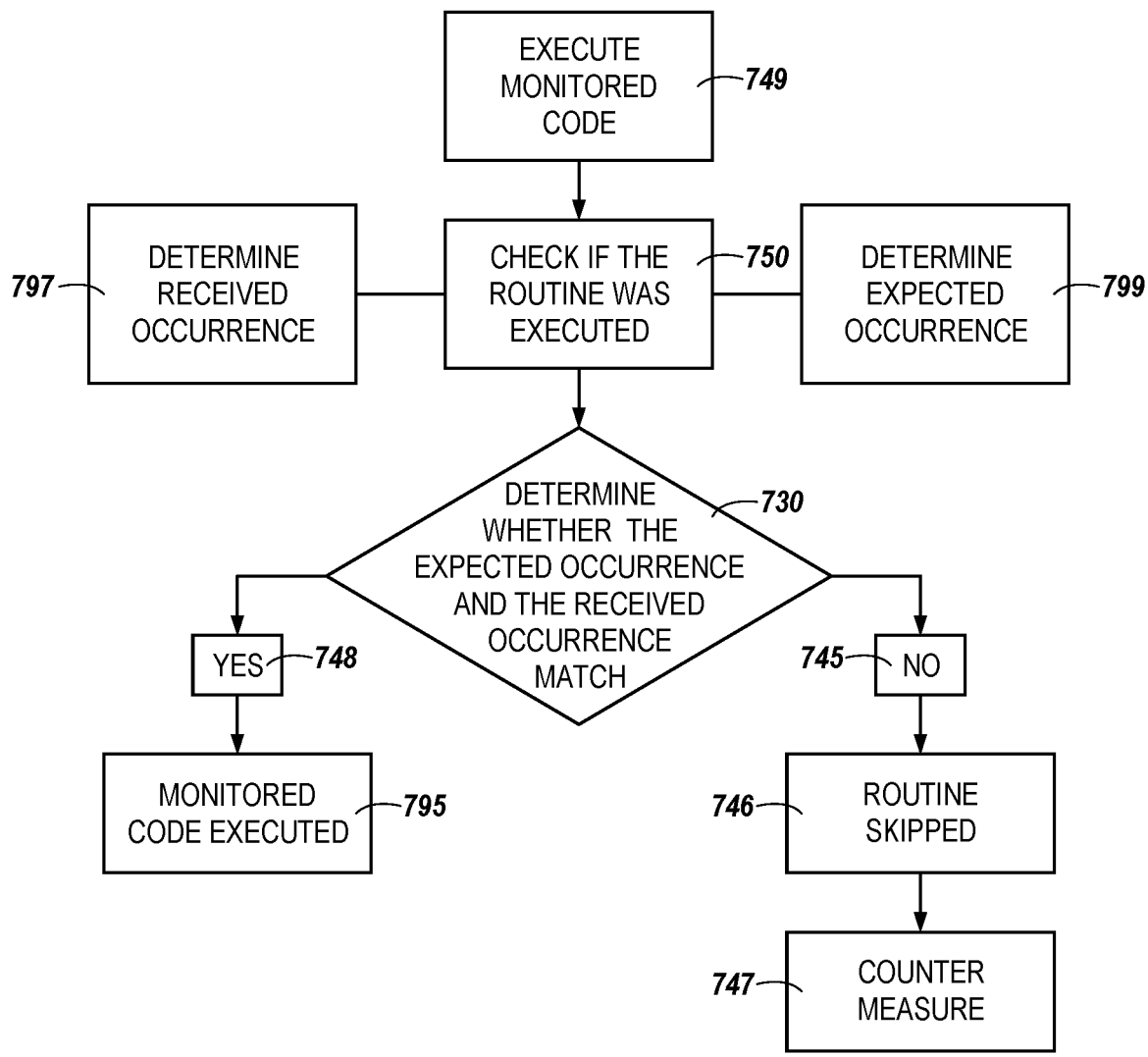
FIG. 7 illustrates an example flow diagram for run-time code execution validation in accordance with embodiments of the disclosure.

FIG. 7 illustrates an example flow diagram for run-time code execution validation in accordance with embodiments of the disclosure. Circuitry (e.g., the circuitry 210) may monitor run-time executable code stored in a secure array (e.g., the array 201) of a memory device (e.g., the memory device 206) defined by a host (e.g., the host 202). The circuitry may receive an indication that the run-time executable code has executed. In response to the received indication, the circuitry may verify that the monitored run-time executable code (e.g., the monitored run-time executable code 309) actually executed.

For example, at 749, the host may execute the monitored run-time executable code (e.g., the routine) as a sub-function to verify if the routine was actually executed. For example, at 750, the circuitry can check if the routine was executed. The circuitry can determine whether a portion of the run-time executable code (the routine) failed to execute based on an indication. The indication that the monitored run-time executable code was executed may be an occurrence value in a table (e.g., the table 488). For example, the circuitry can, at 797, determine a received occurrence in response to the execution of the run-time executable code defined on the memory (e.g., the memory 216). For example, at 797 the circuitry may determine the received occurrence by checking the occurrence field (e.g., the occurrence 439 field) in the table. The circuitry can also verify the freshness value to avoid the instance that a previous execution result is being used as a result of this current check.

The circuitry can determine an expected occurrence at 799, where the expected occurrence is a representation of a quantity of incidences that the run-time executable code has executed. At 730, the circuitry may determine whether the expected occurrence and the received occurrence match. For example, if the expected occurrence and the received occurrence match ("YES at 748), the circuitry may verify at 795 that the monitored run-time executable code executed and was not skipped. Note However, if the expected occurrence and the received occurrence do not match ("NO" at 745), the circuitry may verify at 746 that the monitored run-time executable code did not execute, and the routine was skipped. For example, the circuitry may compare the received occurrence to an expected occurrence, wherein a difference in value of the received occurrence and the expected occurrence indicate that the portion of run-time executable code failed to execute. In response to this determination, the circuitry may generate a counter measure at 747.

For example, the circuitry is configured to generate a countermeasure in response to the comparison indicating that the portion of run-time executable code failed to execute. In some examples, the countermeasure may be the circuitry configured to generate an alert responsive to the determination that the particular portion of the run-time executable code failed to execute and/or was skipped.

Figure 8:
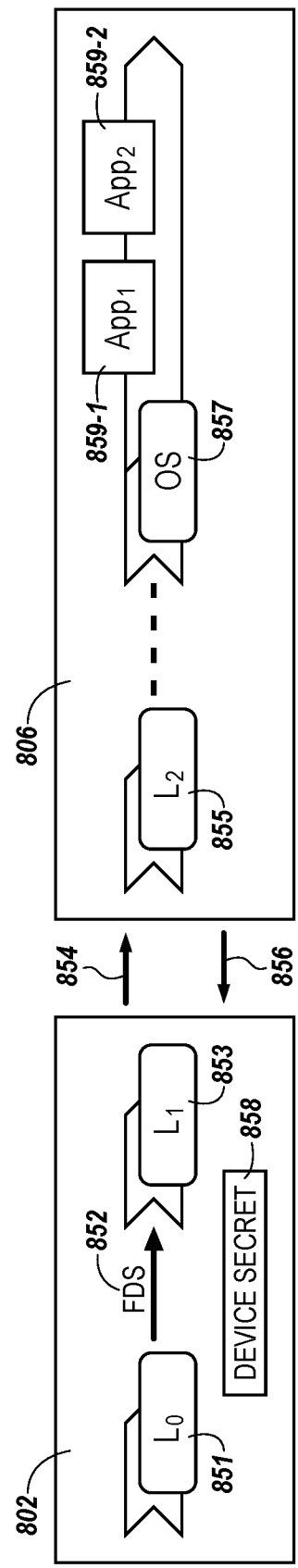
FIG. 8 is a block diagram of an example system including a host and a memory device in accordance with an embodiment of the present disclosure.

FIG. 8 is a block diagram of an example system including a host 802 and a memory device 806 in accordance with an embodiment of the present disclosure. Host 802 and memory device 806 can be, for example, host 202 and memory device 206, respectively, previously described in connection with FIG. 2.

A computing device can boot in stages using layers, with each layer authenticating and loading a subsequent layer and providing increasingly sophisticated runtime services at each layer. A layer can be served by a prior layer and serve a subsequent layer, thereby creating an interconnected web of the layers that builds upon lower layers and serves higher order layers. As is illustrated in FIG. 8, Layer 0 ("$L_0$") 851 and Layer 1 ("$L_1$") 853 are within the host. Layer 0 851 can provide a Firmware Derivative Secret (FDS) key 852 to Layer 1 853. The FDS key 852 can describe the identity of code of Layer 1 853 and other security relevant data. In an example, a particular protocol (such as robust internet of things (RIOT) core protocol) can use the FDS 852 to validate code of Layer 1 853 that it loads. In an example, the particular protocol can include a device identification composition engine (DICE) and/or the RIOT core protocol. As an example, an FDS can include Layer 1 firmware image itself, a manifest that cryptographically identifies authorized Layer 1 firmware, a firmware version number of signed firmware in the context of a secure boot implementation, and/or security-critical configuration settings for the device. A device secret 858 can be used to create the FDS 852 and be stored in memory of the host 802.

The host can transmit data, as illustrated by arrow 854, to the memory device 806. The transmitted data can include an external identification that is public, a certificate (e.g., an external identification certificate), and/or an external public key. Layer 2 ("$L_2$") 855 of the memory device 806 can receive the transmitted data, and execute the data in operations of the operating system ("OS") 857 and on a first application 859-1 and a second application 859-2.

In an example operation, the host 802 can read the device secret 858, hash an identity of Layer 1 853, and perform a calculation including:

$$K_{L1}=KDF[Fs(s),\text{Hash}(\text{``immutable information''})]$$

where $K_{L1}$ is an external public key, KDF (e.g., KDF defined in the National Institute of Standards and Technology (NIST) Special Publication 800-108) is a key derivation function (e.g., HMAC-SHA256), and Fs(s) is the device secret 858. FDS 852 can be determined by performing:

$$FDS=HMAC\text{-}SHA256[Fs(s),SHA256(\text{``immutable information''})]$$

Likewise, the memory device 806 can transmit data, as illustrated by arrow 856, to the host 802.

Figure 9:
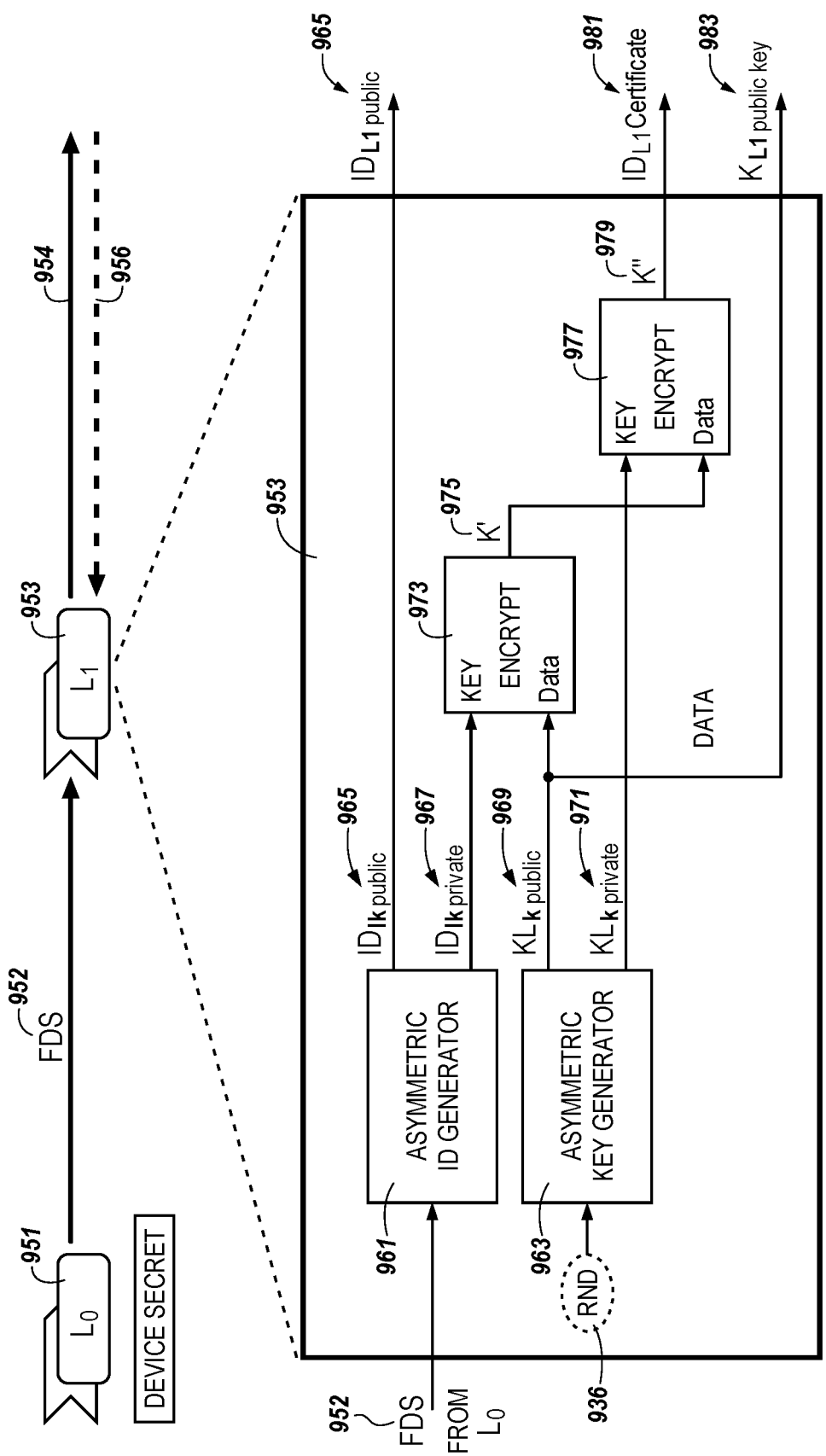
FIG. 9 is a block diagram of an example process to determine a number of parameters in accordance with an embodiment of the present disclosure.

FIG. 9 is a block diagram of an example process to determine a number of parameters in accordance with an embodiment of the present disclosure. FIG. 9 is an example of a determination of the parameters including the external public identification, the external certificate, and the external public key that are then sent, indicated by arrow 954, to Layer 2 (e.g., Layer 2 855) of a memory device (e.g., 806 in FIG. 8). Layer 0 ("$L_0$") 951 in FIG. 9 corresponds to Layer 0 851 in FIG. 8 and likewise FDS 952 corresponds to FDS 852, Layer 1 953 corresponds to Layer 1 853, and arrows 954 and 956 correspond to arrows 854 and 856, respectively.

The FDS 952 from Layer 0 951 is sent to Layer 1 953 and used by an asymmetric ID generator 961 to generate a public identification ("$ID_{lk\ public}$") 965 and a private identification 967. In the abbreviated "$ID_{lk\ public}$," the "lk" indicates Layer k (in this example Layer 1), and the "public" indicates that the identification is openly shared. The public identification 965 is illustrated as shared by the arrow extending to the right and outside of Layer 1 953 of the host. The generated private identification 967 is used as a key input into an encryptor 973. The encryptor 973 can be any processor, computing device, etc. used to encrypt data.

Layer 1 953 of a host can include an asymmetric key generator 963. In at least one example, a random number generator (RND) 936 can optionally input a random number into the asymmetric key generator 963. The asymmetric key generator 963 can generate a public key ("$K_{Lk\ public}$") 969 (referred to as an external public key) and a private key ("$K_{LK\ private}$") 971 (referred to as an external private key) associated with a host such as host 802 in FIG. 8. The external public key 969 can be an input (as "data") into the encryptor 973. The encryptor 973 can generate a result K' 975 using the inputs of the external private identification 967 and the external public key 969. The external private key 971 and the result K' 975 can be input into an additional encryptor 977, resulting in output K" 979. The output K" 979 is the external certificate ("$ID_{L1}$ certificate") 981 transmitted to the Layer 2 (855 of FIG. 8). The external certificate 981 can provide an ability to verify and/or authenticate an origin of data sent from a device. As an example, data sent from the host can be associated with an identity of the host by verifying the certificate, as will be described further in association with FIG. 11. Further, the external public key ("$K_{L1\ public\ key}$") 983 can be transmitted to Layer 2. Therefore, the public identification 965, the certificate 981, and the external public key 983 of a host can be transmitted to Layer 2 of a memory device.

Figure 10:
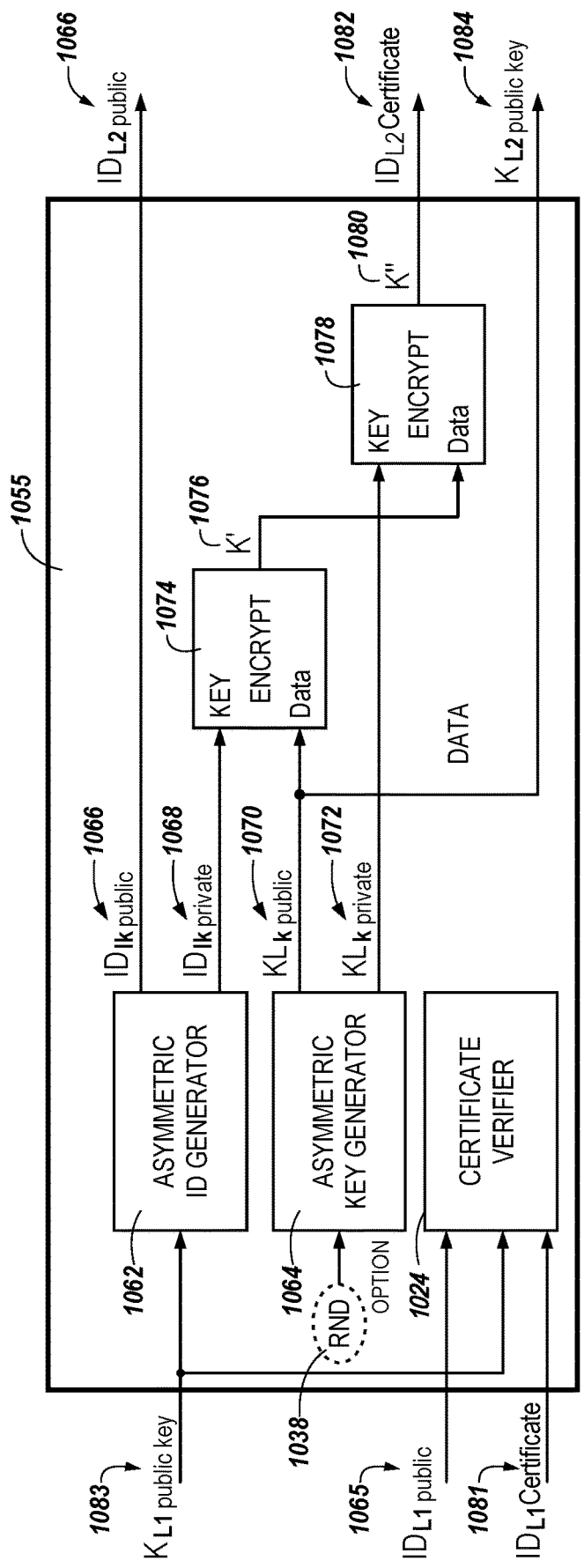
FIG. 10 is a block diagram of an example process to determine a number of parameters in accordance with an embodiment of the present disclosure.

FIG. 10 is a block diagram of an example process to determine a number of parameters in accordance with an embodiment of the present disclosure. FIG. 10 illustrates a Layer 2 1055 of a memory device (e.g., memory device 806 in FIG. 8) generating a device identification ("$ID_{L2\ public}$") 1066, a device certificate ("$ID_{L2\ Certificate}$") 1082, and a device public key ("$K_{L2\ public\ key}$") 1084.

The external public key ("$K_{L1\ public\ key}$") 1083 transmitted from Layer 1 of the host to Layer 2 1055 of a memory device, as described in FIG. 10, is used by an asymmetric ID generator 1062 of the memory device to generate a public identification ("$ID_{lk\ public}$") 1066 and a private identification 1068 of the memory device. In the abbreviated "$ID_{lk\ public}$," the "lk" indicates Layer k (in this example Layer 2), and the "public" indicates that the identification is openly shared. The public identification 1066 is illustrated as shared by the arrow extending to the right and outside Layer 2 1055. The generated private identification 1068 is used as a key input into an encryptor 1074.

As shown in FIG. 10, the external certificate 1081 and external identification 1065, along with the external public key 1083, are used by a certificate verifier 1024. The certificate verifier 1024 can verify the external certificate 1081 received from a host (e.g., host 802), and determine, in response to the external certificate 1081 being verified or not being verified, whether to accept or discard data received from the host. Further details of verifying the external certificate 1081 is described in connection with FIG. 11.

Layer 2 1055 of the memory device can include an asymmetric key generator 1064. In at least one example, a random number generator (RND) 1038 can optionally input a random number into the asymmetric key generator 1064. The asymmetric key generator 1064 can generate a public key ("$K_{Lk\ public}$") 1070 (referred to as a device public key) and a private key ("$K_{LK\ private}$") 1072 (referred to as a device private key) associated with a memory device such as memory device 806 in FIG. 8. The device public key 1070 can be an input (as "data") into the encryptor 1074. The encryptor 1074 can generate a result K' 1076 using the inputs of the device private identification 1068 and the device public key 1070. The device private key 1072 and the result K' 1076 can be input into an additional encryptor 1078, resulting in output K" 1080. The output K" 1080 is the device certificate ("$ID_{L2\ certificate}$") 1082 transmitted back to the Layer 1 (853 of FIG. 8). The device certificate 1082 can provide an ability to verify and/or authenticate an origin of data sent from a device. As an example, data sent from the memory device can be associated with an identity of the memory device by verifying the certificate, as will be described further in association with FIG. 11. Further, the device public key ("$K_{L2\ public\ key}$") 1084 can be transmitted to Layer 1. Therefore, the public identification 1066, the certificate 1082, and the device public key 1084 of the memory device can be transmitted to Layer 1 of a host.

In an example, in response to a host receiving a public key from a memory device, the host can encrypt data to be sent to the memory device using the device public key. Vice versa, the memory device can encrypt data to be sent to the host using the external public key. In response to the memory device receiving data encrypted using the device public key, the memory device can decrypt the data using its own device private key. Likewise, in response to the host receiving data encrypted using the external public key, the host can decrypt the data using its own external private key. As the device private key is not shared with another device outside the memory device and the external private key is not shared with another device outside the host, the data sent to the memory device and the host remains secure.

Figure 11:
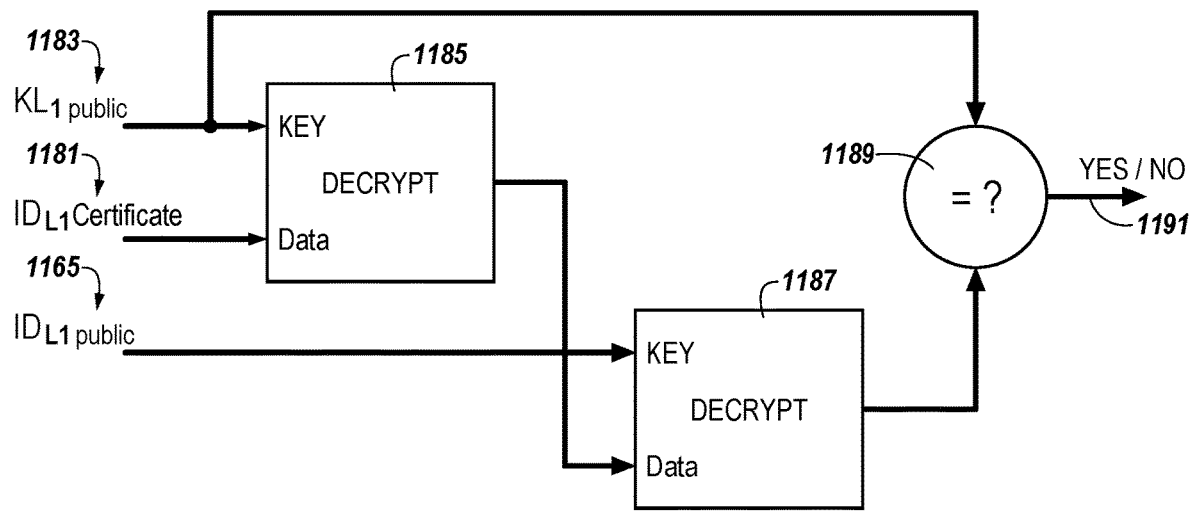
FIG. 11 is a block diagram of an example process to verify a certificate in accordance with an embodiment of the present disclosure.

FIG. 11 is a block diagram of an example process to verify a certificate in accordance with an embodiment of the present disclosure. In the illustrated example of FIG. 11, a public key 1183, a certificate 1181, and a public identification 1165 is provided from a host (e.g., from Layer 1 853 of host 802 in FIG. 8). The data of the certificate 1181 and the external public key 1183 can be used as inputs into a decryptor 1185. The decryptor 1185 can be any processor, computing device, etc. used to decrypt data. The result of the decryption of the certificate 1181 and the external public key 1183 can be used as an input into a secondary decryptor 1187 along with the public identification, and result in an output. The external public key 1183 and the output from the decryptor 1187 can indicate, as illustrated at 1189, whether the certificate is verified by a comparison, resulting in a yes or no 1191 as an output. In response to the certificate being verified, data received from the device being verified can be accepted, decrypted, and processed. In response to the certificate not being verified, data received from the device being verified can be discarded, removed, and/or ignored. In this way, nefarious devices sending nefarious data can be detected and avoided. As an example, a hacker sending data to be processed can be identified and the hacking data not processed.

Figure 12:
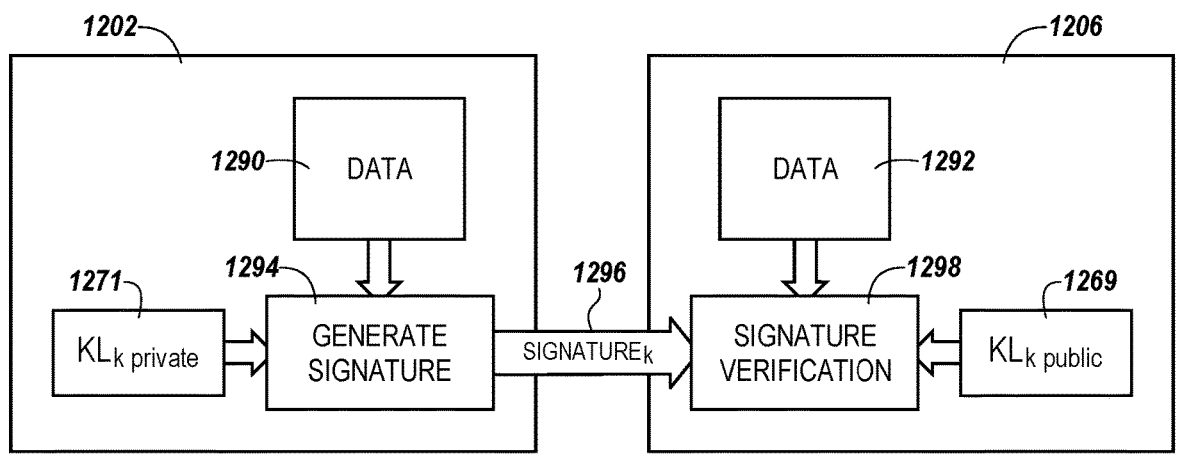
FIG. 12 is a block diagram of an example process to verify a signature in accordance with an embodiment of the present disclosure.

FIG. 12 is a block diagram of an example process to verify a signature in accordance with an embodiment of the present disclosure. In the instance where a device is sending data that may be verified in order to avoid subsequent repudiation, a signature can be generated and sent with data. As an example, a first device may make a request of a second device and once the second device performs the request, the first device may indicate that the first device never made such a request. An anti-repudiation approach, such as using a signature, can avoid repudiation by the first device and insure that the second device can perform the requested task without subsequent difficulty.

A host 1202 (such as host 202 in FIG. 2) can send data 1290 to a memory device 1206 (such as memory device 206 in FIG. 2). The host 1202 can generate, at 1294, a signature 1296 using a device private key 1271. The signature 1296 can be transmitted to the memory device 1206. The memory device 1206 can verify, at 1298, the signature using data 1292 and the external public key 1269 previously received. In this way, the signature is generated using a private key and verified using a public key. In this way, the private key used to generate a unique signature can remain private to the device sending the signature while allowing the receiving device to be able to decrypt the signature using the public key of the sending device for verification. This is in contrast to encryption/decryption of the data, which is encrypted by the sending device using the public key of the receiving device and decrypted by the receiving device using the private key of the receiver. In at least one example, the device can verify the digital signature by using an internal cryptography process (e.g., Elliptical Curve Digital signature (ECDSA) or a similar process.

Figure 13:
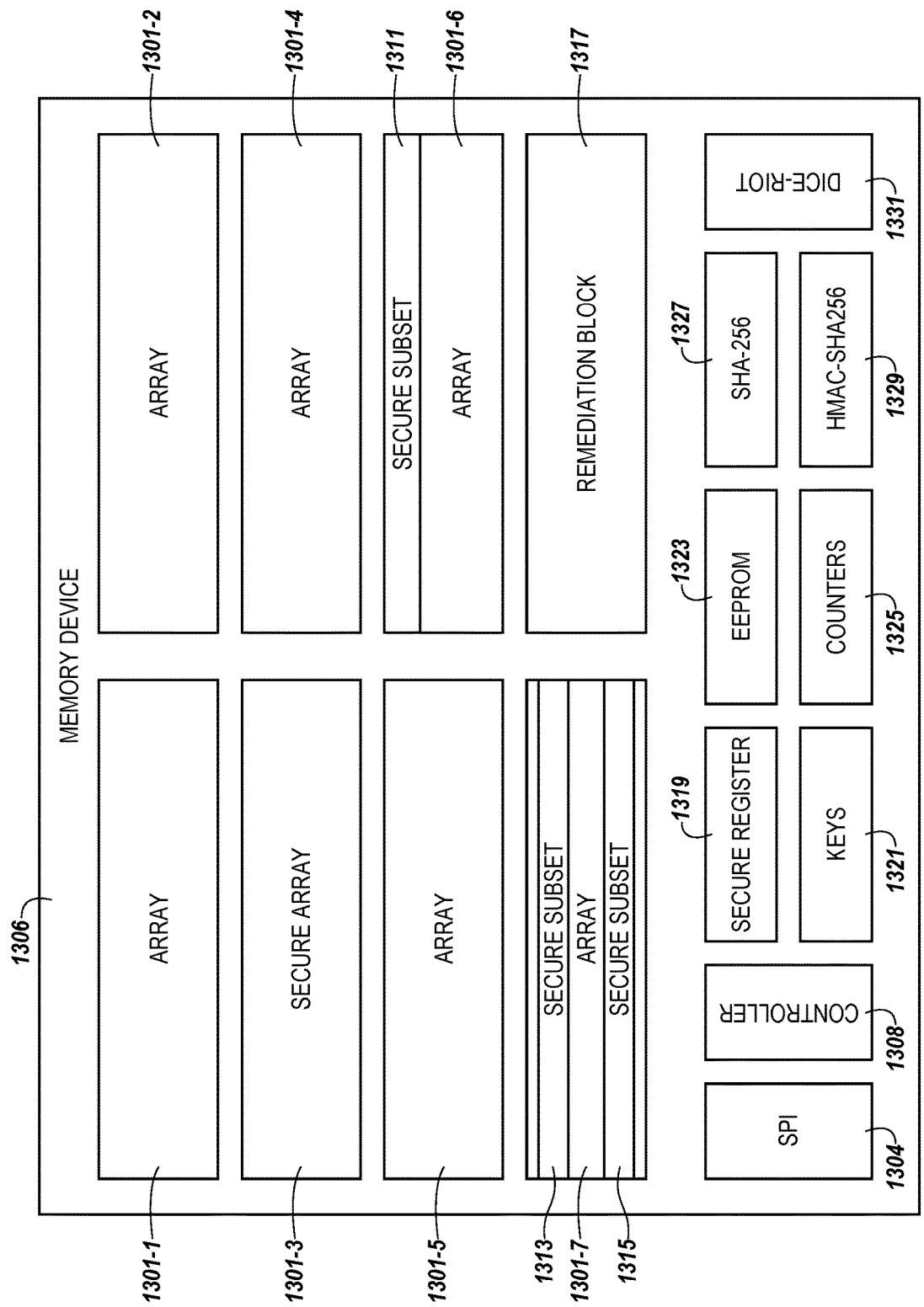
FIG. 13 is a block diagram of an example memory device in accordance with an embodiment of the present disclosure.

FIG. 13 is a block diagram of an example memory device 1306 in accordance with an embodiment of the present disclosure. Memory device 1306 can be, for example, memory device 206 previously described in connection with FIG. 2.

As shown in FIG. 13, memory device 1306 can include a number of memory arrays 1301-1 through 1301-7. Memory arrays 1301-1 through 1301-7 can be analogous to memory array 101 previously described in connection with FIG. 1. Further, in the example illustrated in FIG. 13, memory array 1301-3 is a secure array, subset 1311 of memory array 1301-6 comprises a secure array, and subsets 1313 and 1315 of memory array 1301-7 comprise a secure array. Subsets 1311, 1313, and 1315 can each include, for instance, 4 kilobytes of data. However, embodiments of the present disclosure are not limited to a particular number or arrangement of memory arrays or secure arrays.

As shown in FIG. 13, memory device 1306 can include a remediation (e.g., recovery) block 1317. Remediation block 1317 can be used as a source of data in case of errors (e.g., mismatches) that may occur during operation of memory device 1306. Remediation block 1317 may be outside of the area of memory device 1306 that is addressable by a host.

As shown in FIG. 13, memory device 1306 can include a serial peripheral interface (SPI) 1304 and a controller 1308. Memory device 1306 can use SPI 1304 and controller 1308 to communicate with a host and memory arrays 1301-1 through 1301-7, as previously described herein (e.g., in connection with FIG. 2).

As shown in FIG. 13, memory device 1306 can include a secure register 1319 for managing the security of memory device 1306. For example, secure register 1319 can configure, and communicate externally, to an application controller. Further, secure register 1319 may be modifiable by an authentication command.

As shown in FIG. 13, memory device 1306 can include keys 1321. For instance, memory device 1306 can include eight different slots to store keys such as root keys, DICE-RIOT keys, and/or other external session keys.

As shown in FIG. 13, memory device 1306 can include an electronically erasable programmable read-only memory (EEPROM) 1323. EEPROM 1323 can provide a secure non-volatile area available for a host, in which individual bytes of data can be erased and programmed.

As shown in FIG. 13, memory device 1306 can include counters (e.g., monotonic counters) 1325. For instance, memory device 1306 can include six different monotonic counters, two of which may be used by memory device 1306 for authenticated commands, and four of which may be used by the host.

As shown in FIG. 13, memory device 1306 can include a SHA-256 cryptographic hash function 1327, and/or an HMAC-SHA256 cryptographic hash function 1329. SHA-256 and/or HMAC-SHA256 cryptographic hash functions 1327 and 1329 can be used by memory device 1306 to generate cryptographic hashes, such as, for instance, the cryptographic hash of a command as previously described herein, and/or a golden hash used to validate data stored in memory arrays 1301-1 through 1301-7. Further, memory device 1306 can support $L_0$ and $L_1$ of DICE-RIOT 1331.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a memory device; and
   circuitry configured to:
   monitor run-time executable code, including a security routine associated with a command to be executed, stored in a secure array of the memory device;
   receive an indication that a portion of the run-time executable code executed during run-time of a computing device has failed to execute, wherein the indication includes a received Message Authentication Code (MAC), with a freshness field which includes a freshness value written when a program counter reaches a start address of the security routine, and an occurrence field which represents a quantity of incidences that the run-time executable code has executed, and wherein the freshness field and the occurrence field are updated with each execution of the security routine;
   generate an expected, recalculated MAC for the run-time executable code, including the security routine associated with the command to be executed, each time the run-time executable code is executed, using updated freshness and occurrence fields;
   compare the received MAC to the expected MAC; and
   take an action in response to the indication upon determination that the portion of the run-time executable code failed to execute.

2. The apparatus of claim 1, wherein the circuitry is further configured to compare the received MAC to the generated MAC to detect when the received MAC and the generated MAC have different values.

3. The apparatus of claim 1, wherein the circuitry is further configured to generate an alert responsive to the determination that the portion of the run-time executable code failed to execute.

4. The apparatus of claim 1, wherein the circuitry is further configured to:
generate the expected, recalculated MAC for the run-time executable code, including the security routine associated with the command to be executed, using asymmetric cryptography.

5. The apparatus of claim 1, wherein the circuitry is further configured to receive, as part of the received MAC, a start address of the secure array and an end address of the secure array.

6. The apparatus of claim 1, wherein the circuitry is further configured to:
generate the expected, recalculated MAC for the run-time executable code, including the security routine associated with the command to be executed, using symmetric cryptography and a unique secret key shared between the memory device and a host using an asymmetric protocol.

7. The apparatus of claim 1, wherein the circuitry is further configured to receive an occurrence representing a quantity of incidences that the run-time executable code has executed.

8. The apparatus of claim 1, wherein the portion of the run-time executable code is part of a routine to validate that a security protocol transpired.

9. The apparatus of claim 1, wherein the circuitry is further configured to generate the expected MAC comprising a secret key, wherein the secret key corresponds to the portion of the run-time executable code.

10. A system, comprising: a host; and a memory device coupled to the host; wherein the host is configured to:
define, on the memory, a start address of a run-time executable code and an end address of the run-time executable code, including a security routine associated with a command to be executed;
receive a Message Authentication Code (MAC) in response to the execution of the run-time executable code, including the security routine associated with the command to be executed, defined on the memory;
generate an expected, recalculated MAC for the run-time executable code, including the security routine associated with the command to be executed, each time the run-time executable code is executed, using updated freshness and occurrence fields;
compare the received MAC to the expected MAC to check whether a portion of the run-time executable code defined on the memory executed, wherein the expected MAC includes a freshness field having a freshness value written when a program counter reaches the defined start address of the security routine;
identify an occurrence representing a quantity of incidences that the portion of the run-time executable code has executed, the defined start address and an end address of the security routine, wherein the freshness field and the occurrence field are updated with each execution of the security routine; and
take an action based on the comparison of the expected MAC, the received MAC, and the identified occurrence.

11. The system of claim 10, wherein the action is a countermeasure in response to a determination that the portion of the run-time executable code failed to execute.

12. The system of claim 11, wherein the countermeasure is to abort the run-time executable code in response to the determination that the portion of the run-time executable code failed to execute.

13. The system of claim 10, wherein the action is a generated alert in response to a determination that the portion of the run-time executable code failed to execute.

14. A method, comprising:
monitoring run-time executable code, including a security routine associated with a command to be executed, stored in a secure array of a memory device;
receiving an indication that the run-time executable code, including the security routine associated with the command to be executed, has executed;
determining that a portion of the run-time executable code failed to execute based on the indication, wherein the indication comprises at least one of a received Message Authentication Code (MAC), including a freshness field having a freshness value written when a program counter reaches a start address of the security routine, and a received occurrence representing a quantity of incidences that the run-time executable code has executed, the start address and an end address in the secure array, and wherein the freshness field and an occurrence field are updated with each execution of the security routine; and
generating a countermeasure in response to the determination that the portion of run-time executable code failed to execute.

15. The method of claim 14, wherein determining the portion of run-time executable code further comprises determining that the portion of the run-time executable code is a software license check routine.

16. The method of claim 14, wherein the portion of run-time executable code further comprises determining that the portion of run-time executable code is a payment service check routine.

17. The method of claim 14, wherein determining the portion of run-time executable code further comprises determining that the portion of run-time executable code is a routine to check if a system component of a host is genuine.

18. The method of claim 14, wherein the determining the portion of run-time executable code further comprises determining that the portion of run-time executable code is an anti-replay routine to detect whether the run-time executable code has executed.

19. The method of claim 14, further comprising:
comparing the received occurrence to an expected occurrence; and
updating the quantity of incidences that the run-time executable code has executed in response to a determination that the expected occurrence and the received occurrence are the same.

20. The method of claim 14, further comprising generating a digital signature for the received MAC having an elliptical curve.

* * * * *